United States Patent [19]

Johnson

[11] 3,972,392
[45] Aug. 3, 1976

[54] FAIL-SAFE CLAMPING APPARATUS

[76] Inventor: Norman Allen Johnson, 5325 Tenth Ave., South Delta, British Columbia, Canada

[22] Filed: Apr. 7, 1975

[21] Appl. No.: 565,482

[52] U.S. Cl. .............................. 188/43; 188/170
[51] Int. Cl.² ......................................... B61H 7/12
[58] Field of Search ............... 188/41, 43, 44, 170; 104/243; 105/216

[56] References Cited
UNITED STATES PATENTS

| | | | |
|---|---|---|---|
| 1,297,083 | 3/1919 | Brown | 188/43 |
| 1,644,942 | 10/1927 | Norris | 188/43 |
| 1,740,726 | 12/1929 | Case | 188/43 |
| 2,856,030 | 10/1958 | Snow, Jr. | 188/43 |

FOREIGN PATENTS OR APPLICATIONS

| | | | |
|---|---|---|---|
| 37,036 | 7/1935 | Netherlands | 188/43 |
| 16,497 | 6/1900 | United Kingdom | 188/43 |
| 244,581 | 10/1969 | U.S.S.R. | 188/41 |

*Primary Examiner*—Trygve M. Blix
*Assistant Examiner*—Edward R. Kazenske

[57] ABSTRACT

A fail-safe clamping apparatus adapted to grip the sides of rails such as those used for cranes and railroads. The clamping apparatus includes a frame adapted for primary movement relative to and substantially parallel with the clamped member, and secondary movement substantially perpendicular to the sides of the clamped member. Secured to the frame, in opposed relation to the clamped member, are lateral guide brackets. A yoke assembly comprising a pair of lever pins and a pair of yoke members is slidably mounted in the lateral guide brackets for movement substantially perpendicular to the sides of the clamped member. Each one of a pair of clamp levers, having clamping surfaces in opposed relation to the sides of the clamped member, is pivotally mounted at one end on one of the lever pins. An actuating link is pivotally connected to the other end of each clamp lever. A fail-safe linear actuator is operatively secured to the frame such that its actuating axis is substantially perpendicular to an axis parallel with the clamped member and an axis perpendicular to the sides of the clamped member. The actuating links are pivotally connected to the linear actuator. The clamping surfaces and yoke assembly are moveable in the lateral guide brackets to compensate for the secondary movement of the frame. In their retracted position, the clamping surfaces are protected from contact with the clamped member by guide members secured to the yoke assembly.

3 Claims, 7 Drawing Figures

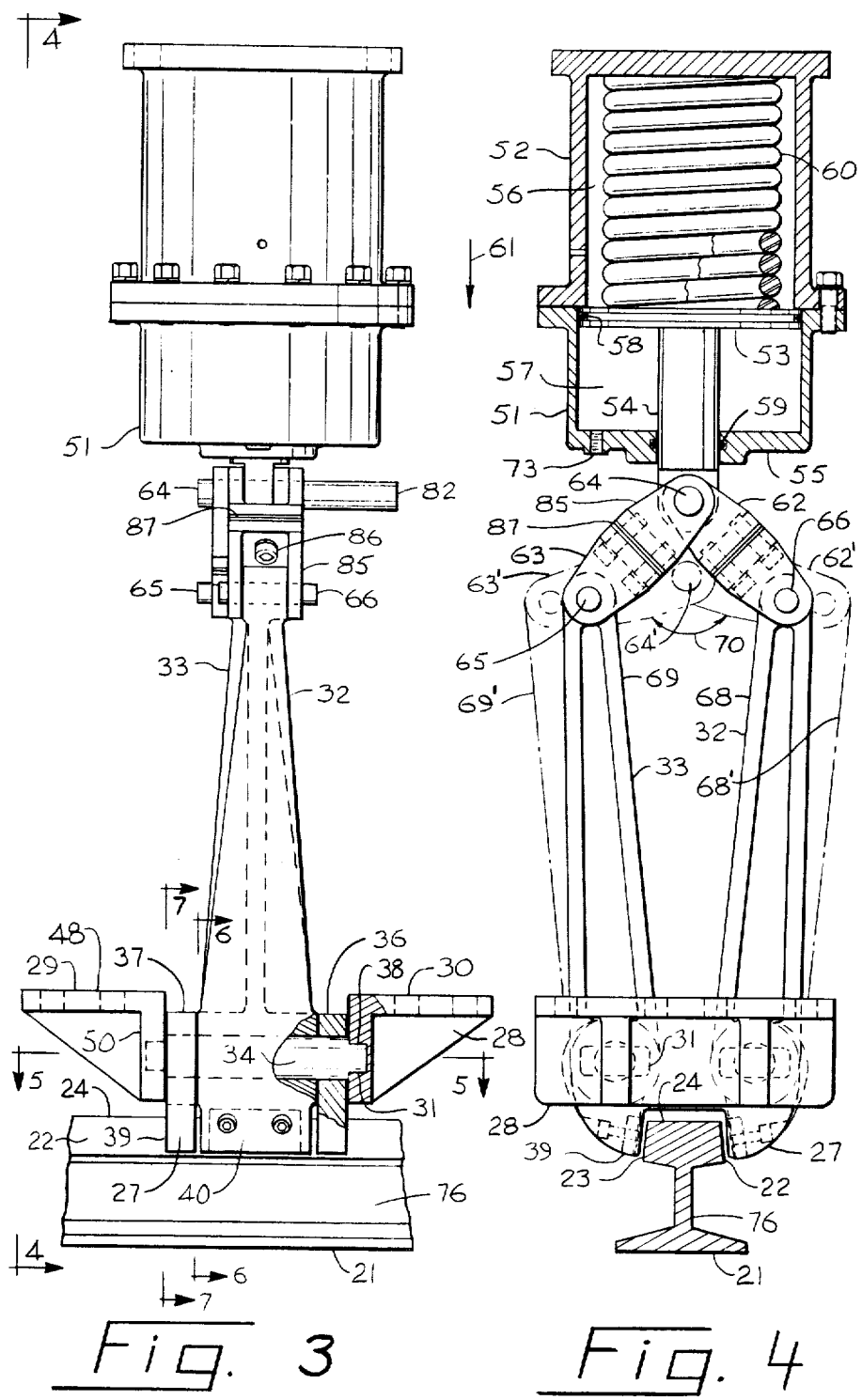

FAIL-SAFE CLAMPING APPARATUS

This invention relates to novel improvements in devices known in the art to which they pertain as fail-safe clamps and brakes of the general character of clamping devices which apply substantially equal and opposite forces to opposite sides of a clamped member. Specifically, this invention employs novel means for clamping the sides of crane rails in a fail-safe mode of operation such that an unpowered or unattended crane is secured to its rails whereby to resist external forces tending to move the crane along the rails. Still more specifically, this invention is adapted to secure unattended container cranes to their rails as against the external forces of hurricane and other such severe wind forces which from time to time occur in exposed maritime locations.

A fail-safe clamping apparatus adapted to clamp the sides of crane rails must satisfy several requirements. First, it must be independently powered by fail-safe means such that it is actuated when the crane is unpowered or unattended. Second, the clamping assembly must permit sufficient lateral movement of the clamp with respect to the rail to accommodate the movement of the crane wheels on the rail as limited by the tread width between the wheel flanges. Third, lateral movement of the clamp assembly should not significantly alter the angle at which the clamping surfaces approach the sides of the crane rails. Fourth, where the clamping surfaces comprise metal serrated shoes of hardness substantially greater than that of the rail, means should be provided to prevent the shoes from dragging on the rails when the crane moves along its rails. Fifth, the clamping assembly should be of narrow cross section such that the opening in a travelled surface in which the rails are embedded, as in the case of a dock facility, does not exceed approximately three times the width of the top of the rail. Finally, means should be provided whereby remote sensing means are provided to indicate to the crane operator that the clamp is fully released prior to movement of the crane on its rails.

Accordingly, one object of this invention is to provide an improved fail-safe clamping assembly which is self-energized in its clamping mode.

Another object of this invention is to provide a fail-safe clamping apparatus wherein the clamping assembly is so mounted as to provide lateral movement perpendicular to the sides of a clamped member.

Yet another object of this invention is to provide a fail-safe clamping apparatus in which lateral movement of the clamping assembly does not significantly alter the angle at which its clamping surfaces approach the sides of a clamped member.

Still another object of this invention is to provide a fail-safe clamping apparatus in which the clamping portions of the clamping assembly are the only portion thereof in the immediate vicinity of the sides of the clamped member.

A further object of this invention is to provide sensing means whereby the fully released position of the clamping surfaces are indicated at a remote location.

Yet another object is to provide a fail-safe clamping apparatus in which the clamping surfaces, when in their fully released position, are prevented from dragging on sides of a clamped member.

Still a further object of this invention is to provide a fail-safe clamping apparatus wherein its clamping surfaces are externally mounted to facilitate periodic examination without disassembling the clamping assembly.

These and still further objects and advantages of the present invention reside in the details of construction of a preferred embodiment disclosed herein and will be evident to one skilled in the art from a study of the specification and accompanying drawings. Therefore, the preferred embodiment disclosed is merely exemplary and is not intended to detract from the full scope of the invention as set out in the annexed claims.

In the drawings, wherein like numerals refer to like parts:

FIG. 3 is an enlarged partially sectioned side view of the structural elements of a fail-safe clamping apparatus, excluding an assembly frame, taken substantially along line 3—3 in FIG. 2;

FIG. 4 is an enlarged partially sectioned end view of the structural elements of a fail-safe clamping apparatus taken substantially along line 4—4 in FIG. 3;

Figure 1:
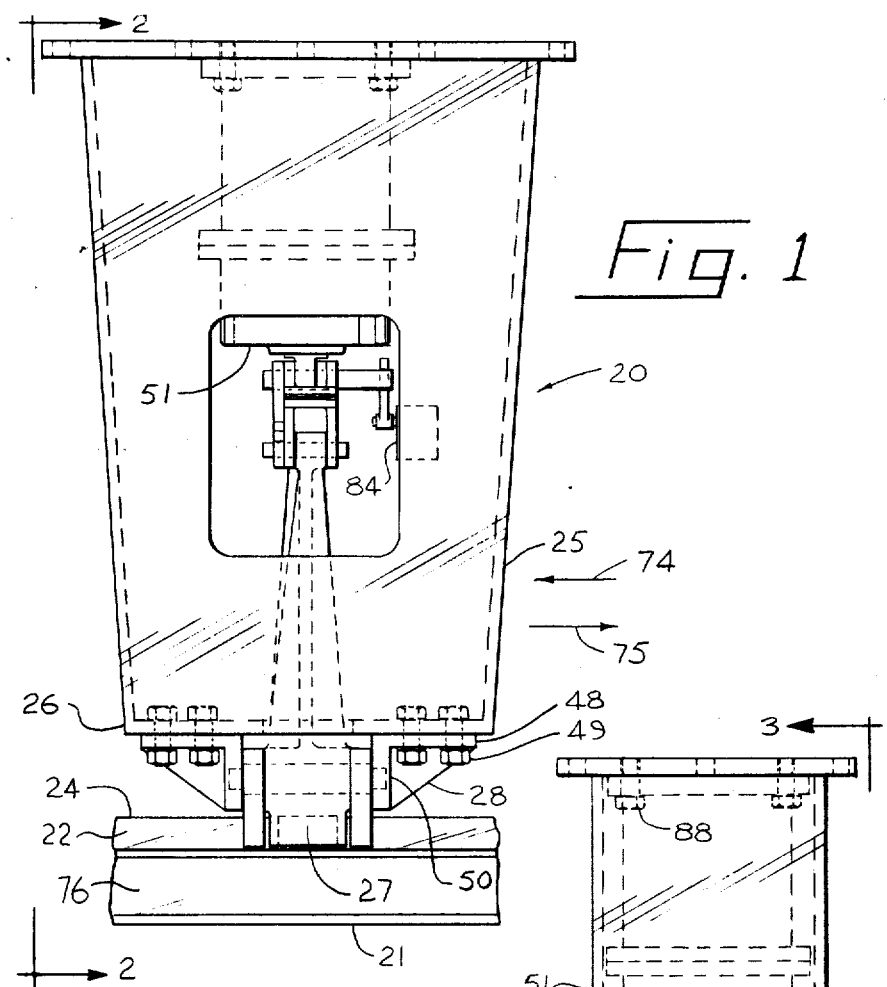
FIG. 1 is a side view of a fail-safe clamping apparatus taken substantially perpendicular to a clamped member.
Figure 2:
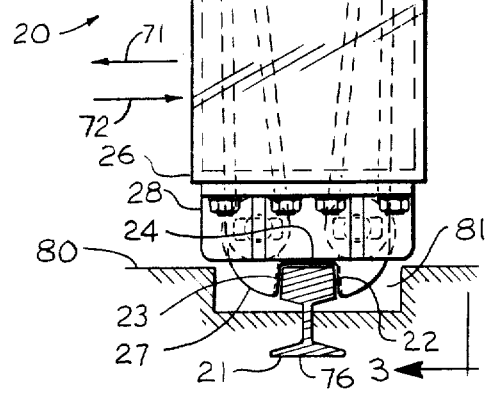
FIG. 2 is an end view of the fail-safe clamping apparatus taken substantially along line 2—2 in FIG. 1.
Figure 5:
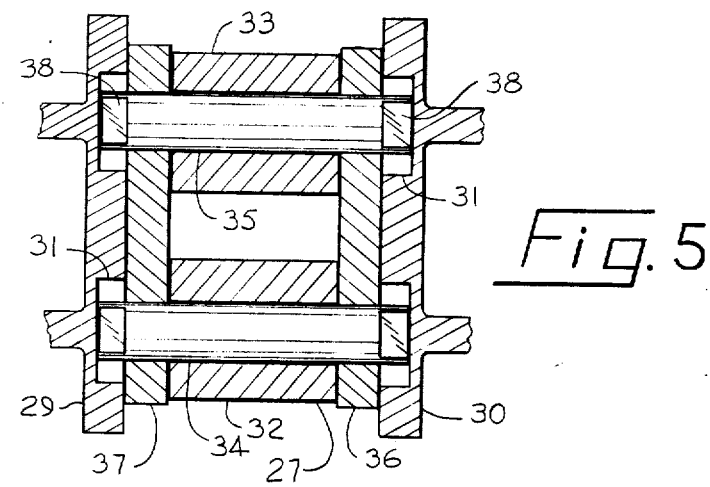
FIG. 5 is a sectional view of the clamping assembly taken substantially along line 5—5 in FIG. 3.

Referring now to the drawings, FIGS. 1 and 2 illustrate the general structure of a preferred embodiment of a fail-safe clamping apparatus 20, in accordance with the present invention, in combination with a clamped member 21. Clamped member 21 includes opposing sides 22 and 23 and lateral surface 24.

Fail-safe clamping apparatus 20 includes a frame means 25 normally secured to structure which is adapted for movement relative to member 21. In the case of a crane, frame means 25 is secured to the crane and moves with the crane along member 21, normally a crane rail, in either of primary movement directions 74 or 75.

Operatively mounted on the clamped member end 26 of frame means 25 is clamping assembly 27. With reference fo FIGS. 3 through 7, clamping assembly 27 includes lateral guide means 28 comprising a pair of end-brackets 29 and 30 having lateral portion 48 secured to frame 25 by bolts 49 and slotted holes 31 in perpendicular portion 50. Included in clamping assembly 27 are a pair of clamp levers 32 and 33 pivotally mounted respectively on lever pin means 34 and 35. Lever pin means 34 and 35 are mounted in a pair of yoke means 36 and 37 and include flattened ends 38 which extend through yoke means 36 and 37 and are slidably mounted in slotted holes 31 of end-brackets 29 and 30. Yoke means 36 and 37 include guide members 39 which extend along opposing sides 22 and 23 of clamped member 21. Secured to clamping ends 40 and 41 of levers 32 and 33, respectively, are clamping surface means 42 and 43. Clamping surface means 42 and 43 comprise serrated shoes 44 and securing bolts 45 accessible from the exterior area 46 of assembly 27 such that shoes 44 may be removed in direction 47 for periodic inspection without disassembling assembly 27.

Operatively mounted inside frame means 25 by means of bolts 88 is fail-safe linear actuator 51 having a cylinder portion 52, piston portion 53 slidably mounted in cylinder portion 52, rod portion 54 secured to piston portion 53 and extending slidably through end 55 of cylinder portion 52, spring chamber 56 on one side, and fluid chamber 57 on the other side of piston portion 53. Seal means 58 and 59 seal interacting surfaces of cylinder portion 52 with piston portion 53 and rod portion 54 respectively. Mechanical compression spring means 60 is operatively mounted in spring chamber 56 such that it imparts a force in direction 61 to piston portion 53.

A pair of actuating links 62 and 63 are pivotally connected at one end by actuating pin means 64 to rod portion 54. The other ends of links 62 and 63 are pivotally connected by pin means 65 and 66 to actuated ends 68 and 69 of clamp levers 32 and 33, respectively. Links 62 and 63 are comprised of link halves 85 secured together by bolts 86. Shims 87 may be added between link halves 85 to adjust the opening between surfaces 42 and 43.

Figure 6:
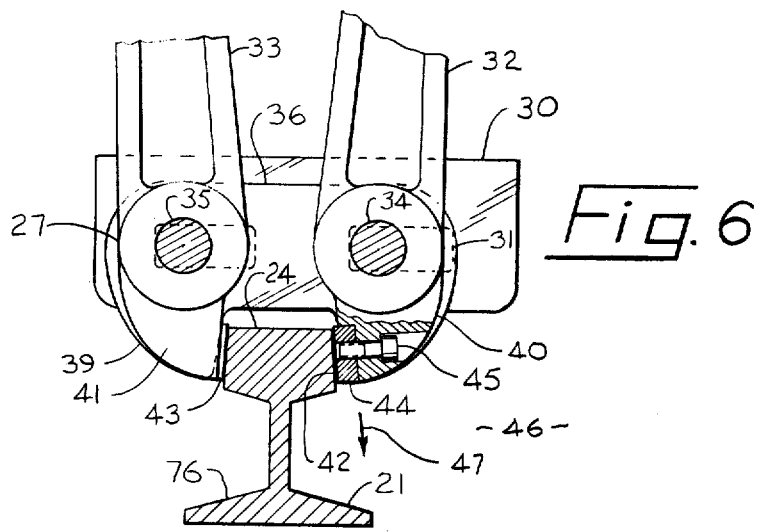
FIG. 6 is a sectional view of the clamping assembly taken substantially along line 6—6 in FIG. 3.

Turning now to the operation of my present invention, FIG. 4 illustrates piston 53 actuated in fail-safe mode by spring 60 into position 53'. Links 62 and 63 and lever ends 68 and 69 are forced into positions 62', 63', 68', and 69'. In actuated positions 68' and 69' of levers 32 and 33, clamping surface means 42 and 43 bear on sides 22 and 23 of member 21, as illustrated in FIG. 6, thus securing clamping assembly 27 and frame 25 to member 21 subject to the coefficient of friction between surfaces 42 and 43 and member sides 22 and 23. It is accepted in the art that the coefficient of friction is increased above that found for smooth surfaces if surfaces 42 and 43 are serrated substantially harder than member 21.

It will be evident to one skilled in these arts that, as spring 60 extends, its actuating force decreases. Hence, the actuating force in pin 64 in position 64' will be substantially less than in its fully retracted position. However, it will also be evident that as the angle 70 between links 62 and 63 increases, the resulting forces on lever ends 68 and 69 also increase. It is a matter of design to ensure that the clamping force at surfaces 42 and 43 is equal to or greater than a specified value.

Figure 7:
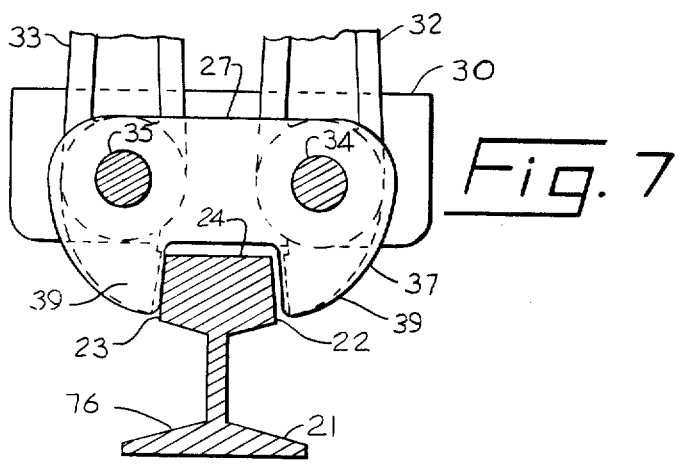
FIG. 7 is a sectional view of the clamping assembly taken substantially along line 7—7 in FIG. 3.

From FIGS. 1 and 2, it will be evident that secondary movement of frame means 25 laterally in direction 71 relative to member 21 will cause two yoke guide members 39 to contact side 23 of member 21, as illustrated in FIG. 7, such that yoke means 36 and 37 remain stationary in lateral guide means 28, pin ends 38 of pins 34 and 35 sliding in slotted holes 31 of end brackets 29 and 30 to a position typically illustrated in FIG. 6. In like manner, secondary movement of frame means 25 in direction 72 causes yoke guide members 39 to contact side 22 of member 21, yoke means 36 and 37 again remaining stationary with respect to member 21 but moving in direction 72 relative to end-brackets 29 and 30. It will be evident to one skilled in this art that the angular movement of surfaces 42 and 43 is substantially relative to the central axis of pin 64 for small movements of yokes 36 and 37 relative to end-brackets 29 and 30. Further, provided that the distance from pin 64 to member sides 22 and 23 is much greater than the lateral movement of yoke means 36 and 37 in lateral guide means 28, the angular movement of surfaces 42 and 43 relative to member sides 22 and 23 may be taken, for practical purposes, as approaching zero. This feature of my present invention ensures that surfaces 42 and 43 bear adequately on member sides 22 and 23 for any operative position of yoke means 36 and 37 relative to lateral guide means 28.

Pressurized fluid entering chamber 57 through port 73 is employed to release clamped member 21. In their released position, clamping surfaces 42 and 43 retract behind yoke guide members 39 such that surfaces 42 and 43 cannot drag on sides 22 and 23 when frame 25 moves in either of directions 74 or 75 relative to clamped member 21. Clearly, lateral movement of the assembly comprising yoke means 36 and 37, pins 34 and 35, and levers 32 and 33 relative to end-brackets 29 and 30 is initiated by contact of members 39 and member sides 22 and 23.

For the specific case where clamped member 21 is a crane rail 76 having a rail top corresponding to lateral surface 24 and rail sides corresponding to member sides 22 and 23, FIG. 2 shows that only clamping ends 40 and 41 of levers 32 and 33 extend below a travelled surface 80 into the recess 81 in which rail 76 is embedded. The narrow openings on either side of the rail permits wheeled traffic to cross the rail.

For a crane operator at a location remote from the clamping apparatus 20, it is desirable to provide a sensing means which will produce a signal for transmission to the operator. Toward this end, actuating pin 64 is extended as indicated in FIGS. 1 and 3 such that, in its fully retracted position, end 82 actuates a limit sensing device 84. Sensing device 84 may be any commonly employed electrical, pneumatic, or hydraulic control device, as required by the circumstances in each particular application of this invention.

It is believed that my invention of a fail-safe clamping apparatus will have been clearly understood from the foregoing detailed description of my now preferred and illustrated embodiment. Various modifications, changes, additions, and equivalents may be resorted to in view of these teachings by one skilled in this art without departing from the spirit of my invention. For instance, frame means 21 may be of various sizes, shapes, modes of construction, and mounting design. Yoke means 36 and 37 may comprise a single member of several members. Linear actuator 51 may have its spring and fluid chambers on the sides of piston 53 opposite to those illustrated in FIG. 4, actuating pin 64 being disposed further away from actuator 51 than pins 65 and 66 and being pulled toward actuator 51 in the fail-safe clamping mode of apparatus 20. Therefore, the present invention is not to be construed as limited to the specific details illustrated and described above, and whereas a choice between variations, modifications, changes, additions and equivalents falling within the true scope of my invention will depend largely upon the circumstances in which it is used, it is my express intention that no limitations be implied and that the hereto annexed claims be given the broadest interpretation to which the language fairly admits.

The embodiments of the invention in which an exclusive property or privilege is claimed are defined as follows:

1. A clamping apparatus in combination with a clamped member having a lateral surface and opposing sides, a frame means in opposed relation to said lateral surface and adapted for primary movement parallel to said clamped member and secondary movement substantially perpendicular to said opposing sides, lateral guide end-brackets secured to said frame means in opposed relation to said lateral surface and having slotted holes on faces substantially perpendicular to said lateral surface, a pair of lever pin means operatively mounted through a pair of yoke means and said lever pin means being slidably mounted in said slotted holes, a pair of clamp levers each pivotally mounted substantially at one end between said yoke means on one of said lever pin means, each clamp lever having a clamping surface means in opposed relation to one of said opposing sides, each said yoke means including a guide member on each side of said clamped member behind which said clamping surface means retracts, a pair of actuating links, a linear actuator operatively mounted in said frame means with its actuating axis substantially perpendicular to said lateral surface, each of said actuating links pivotally interconnected at one end to the other end of one of said clamp levers, the other ends of said actuating links pivotally interconnected to said linear actuator means, whereby actuation of said linear actuator impels said clamping surface means against said opposing sides of said clamped member and slidable movement of said yoke means with respect to said lateral guide end-brackets compensates for said secondary movement of said frame means.

2. A clamping apparatus as defined in claim 1, wherein said clamping surface means comprise a shoe of material substantially harder than that of said clamped member, each of said shoes secured to one of said clamp levers from that side of said clamp lever opposite said shoe.

3. A clamping apparatus in combination with a rail having a rail top and two opposing rail sides, a frame means in opposed relation to said rail top and adapted for primary movement parallel to said rail and secondary movement substantially perpendicular to said opposing rail sides, lateral guide end-brackets secured to said frame means in opposed relation to said rail top and having slotted holes on faces substantially perpendicular to said rail top, a pair of clamp levers each having a clamping end and an actuated end, a clamping surface secured to said clamping end of each of said clamp levers in opposed relation to said rail sides, a pair of lever pins operatively mounted through a pair of yoke means and said lever pins slidably mounted in said slotted holes, each said yoke means having guide members extending along said rail sides, behind which said clamping surfaces retract, each of said pair of clamp levers pivotally mounted between said yoke means on one of said lever pins, a pair of actuating links each pivotally connected at one end to said actuated end of one of said clamp levers, a linear actuator having a cylinder portion and a rod portion secured to a piston portion slidably mounted in said cylinder portion, said cylinder portion operatively secured to said frame means, said actuating links pivotally interconnected at their other ends to said rod portion, whereby actuation of said rod portion impels said clamping surfaces against said rail sides and slidable movement of said yoke means with respect to said lateral guide end-brackets compensates for said secondary movement of said frame means.

* * * * *